(12) United States Patent
Kawarazaki

(10) Patent No.: US 7,180,247 B2
(45) Date of Patent: Feb. 20, 2007

(54) LOAD CONTROL CIRCUIT

(75) Inventor: Yoshiharu Kawarazaki, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 203 days.

(21) Appl. No.: 11/006,190

(22) Filed: Dec. 7, 2004

(65) Prior Publication Data
US 2005/0134200 A1    Jun. 23, 2005

(30) Foreign Application Priority Data
Dec. 8, 2003 (JP) ............................ 2003-409146
Jun. 29, 2004 (JP) ............................ 2004-191774

(51) Int. Cl.
*H05B 37/02* (2006.01)

(52) U.S. Cl. ................. 315/209 R; 315/247; 315/224; 315/307; 315/312

(58) Field of Classification Search .................... None
See application file for complete search history.

(56) References Cited

U.S. PATENT DOCUMENTS

| 5,821,700 | A * | 10/1998 | Malvaso | 315/291 |
| 6,926,423 | B2 * | 8/2005 | Bucher et al. | 362/184 |
| 2003/0178951 | A1 * | 9/2003 | Park et al. | 315/312 |
| 2003/0234762 | A1 * | 12/2003 | Nakatsuka et al. | 345/102 |

* cited by examiner

*Primary Examiner*—Tuyet Thi Vo
(74) *Attorney, Agent, or Firm*—Synnestvedt & Lechner LLP

(57) ABSTRACT

A load control circuit enabling miniaturization of a brightness adjustment system. The load control circuit includes a variable resistor for generating a reference potential. A first duty signal generation circuit connected to the variable resistor controls a LED based on a reference potential. A second duty signal generation circuit connected to the variable resistor generates a second duty signal controls a lamp. The first duty signal generation circuit is configured so that the first duty signal changes differently from the second duty signal.

21 Claims, 9 Drawing Sheets

Resistance of Variable Resistance
(Operated Amount of Brightness Adjustment Switch)

Reference Potential

Fig.11
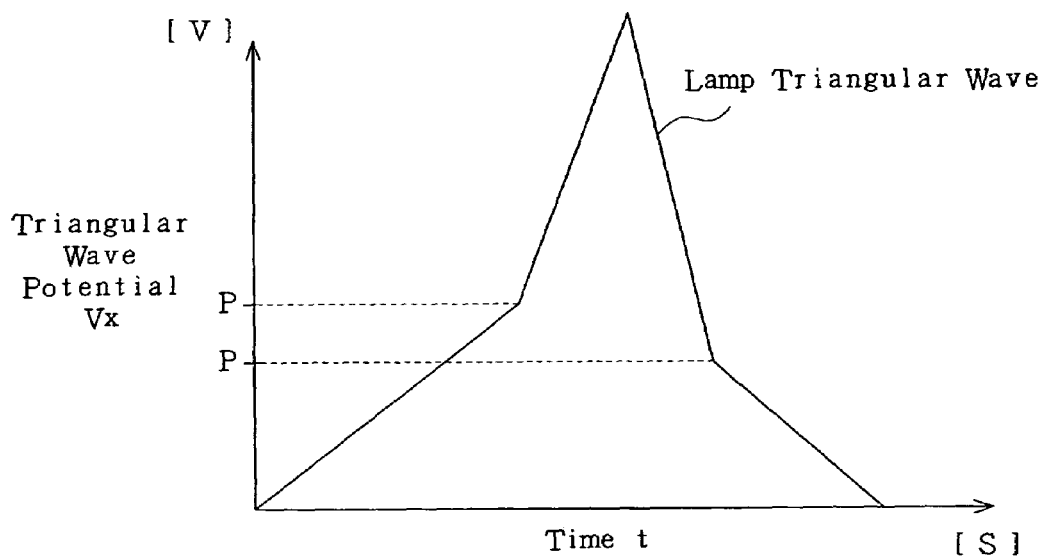
Fig.12
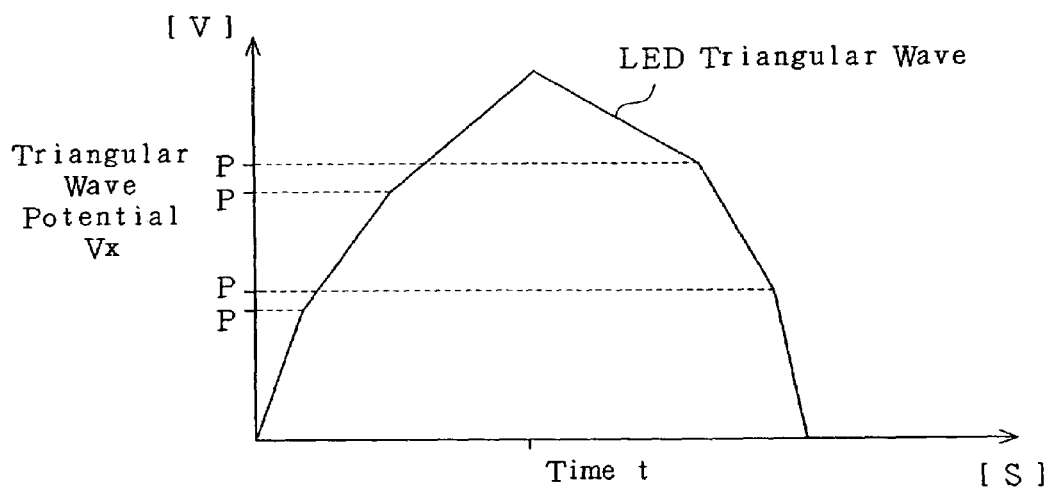
Fig.13
| Lamp Reference Potential Vbs | $a_1$ | $a_2$ | $a_3$ | ... |
|---|---|---|---|---|
| LED Reference Potential Vbt | $b_1$ | $b_2$ | $b_3$ | ... |
45

LOAD CONTROL CIRCUIT

BACKGROUND OF THE INVENTION

The present invention relates to a load control circuit for generating a duty signal based on a triangular wave signal and a reference potential to control a load with the duty signal.

Conventionally, meters, such as a speedometer and a tachometer, are arranged in an instrument panel of a vehicle. Switches, such as an air conditioner switch and a car stereo switch, are arranged on a center cluster. Further, lamps for illuminating the meters and light emitting diodes (LEDs) for illuminating the switches are arranged in the instrument panel and the center cluster. The lamps and LEDs are automatically illuminated when the headlights are turned on. The user of the vehicle operates a brightness adjustment switch, arranged in the instrument panel, to adjust the brightness of the lamps and LEDs.

A rheostat (light adjustment device) is installed in the vehicle to control the illumination of the lamps and LEDs. The rheostat illuminates the lamps and LEDs when the headlights are turned on and further adjusts the brightness of the lamps and LEDs in accordance with the operated amount of the brightness adjustment switch. The rheostat includes a triangular wave generation circuit connected to a capacitor, a waveform shaping circuit connected to the triangular wave generation circuit, and a variable resistor connected to the waveform shaping circuit and the brightness adjustment switch. The triangular waveform generation circuit charges and discharges the capacitor to generate a triangular waveform signal. The waveform shaping circuit compares the triangular waveform signal with a reference potential to generate a duty signal. The variable resistor varies the resistance in accordance with the operated amount of the brightness adjustment switch to determine the reference potential supplied to the waveform shaping circuit.

The rheostat generates the duty signal at a high level or a low level based on the reference potential determined by the variable resistor. More specifically, the rheostat generates the duty signal at a low level when the potential of the triangular wave signal is greater than the reference potential and generates the duty signal at a high level when the potential of the triangular wave signal is less than the reference potential. In this manner, the rheostat provides the lamps and LEDs with the duty signal having a duty ratio that is in accordance with the operated amount of the brightness operation switch. The lamps and LEDs are illuminated with a brightness that is in accordance with the duty ratio of the duty signal provided from the rheostat. Normally, the lamps and LEDs become brighter as the duty ratio increases.

Referring to FIG. 1, the brightness-duty relationship of the lamps differs from that of the LEDs. In FIG. 1, the triangles ($\Delta$) indicate the brightness-duty relationship of the lamps, and the crosses (x) indicate the brightness-duty relationship of the LEDs. As the duty ratio increases, the brightness of the lamps increases as if it is plotted along a parabolic curve, whereas the brightness of the LEDs increases in a linear manner. Accordingly, to equalize the brightness of the lamps with the brightness of the LEDs using the same brightness adjustment switch, the duty ratio of either one of the lamps and the LEDs must be adjusted.

To do so, two waveform shaping circuits, one for the lamps and the other for the LEDs, may be employed with a variable resistor connected to each waveform shaping circuit. In this case, the varied resistance of one of the two variable resistors relative to the operation amount of the brightness adjustment switch is adjusted. Accordingly, the two waveform shaping circuits output duty signals having different duty ratios. For example, when matching the brightness of the LEDs with the brightness of the lamps, the varied resistance of the variable resistor in the intermediate operation range of the brightness adjustment switch is decreased. As a result, in the intermediate operation range, a duty signal having a duty ratio that is less than normal is provided to the LEDs.

However, such variable resistors are relatively large. Furthermore, a vehicle light adjustment system including the above rheostat has two variable resistors, one for the lamps and the other for the LEDs. This enlarges the vehicle light adjustment system. In comparison to the triangular wave generation circuit and the waveform shaping circuit, the ratio of the area occupied by the variable resistors in the entire system is large. In other words, the two variable resistors enlarge the system. For this reason, there is a demand for minimizing the quantity of variable resistors.

SUMMARY OF THE INVENTION

The present invention provides a load control circuit that reduces the size of the brightness adjustment system.

A first aspect of the present invention is a load control circuit connected to a first load and a second load. The load control circuit includes a potential converter for generating a reference potential. A first duty signal generation circuit, connected to the potential converter, generates a first duty signal based on the reference potential to control the first load. A second duty signal generation circuit, connected to the potential converter, generates a second duty signal based on the reference potential to control the second load. The first duty signal generation circuit is configured so that the first duty signal changes differently from the second duty signal.

A second aspect of the present invention is a load control circuit connected to a first capacitor, a second capacitor, a first load, and a second load. The load control circuit includes a first triangular wave generation circuit, connected to the first capacitor, for generating a first triangular wave signal by charging and discharging the first capacitor. A second triangular wave generation circuit, connected to the second capacitor, generates a second triangular wave signal by charging and discharging the second capacitor. The second triangular wave signal has an amplitude that is the same as that of the first triangular wave signal. A potential converter generates a reference potential. A first waveform shaping circuit, connected to the potential converter and the first triangular wave generation circuit, converts the first triangular wave signal based on the reference potential to a first duty signal to control the first load. A second waveform shaping circuit, connected to the potential converter and the second triangular wave generation circuit, converts the second triangular wave signal based on the reference potential to a second duty signal to control the second load. The first triangular wave generation circuit changes at least one of a time constant for charging the first capacitor and a time constant for discharging the first capacitor so that the first duty signal changes differently from the second duty signal.

A third aspect of the present invention is a load control circuit connected to a plurality of first capacitors, a second capacitor, a first load, and a second load. The load control circuit includes a potential converter for generating a reference potential. A plurality of first triangular wave generation circuits, each connected to an associated one of the first capacitors, generate a first triangular wave signal by charging and discharging the associated first capacitor. A second triangular wave generation circuit, connected to the second capacitor, generates a second triangular wave signal by charging and discharging a second capacitor. A switching circuit, connected to the first triangular wave generation circuits, selects one of the first triangular wave generation circuits in accordance with a switch signal to generate a selected one of the first triangular wave signals. A first waveform shaping circuit, connected to the potential converter and the switching circuit, converts the selected one of the first triangular wave signals based on the reference potential to a first duty signal to control the first load. A second waveform shaping circuit, connected to the potential converter, converts the second triangular wave signal based on the reference potential to a second duty signal to control the second load. The first triangular wave generation circuits each generate the first triangular wave signal with an amplitude differing from that of the second triangular wave signal. The switching circuit switches the selected one of the first triangular wave generation circuits so that the first duty signal changes differently from the second duty signal when the switch signal reaches a predetermined threshold value.

A fourth aspect of the present invention is a load control circuit connected to a capacitor, a first load, and a second load. The load control circuit includes a potential converter for generating a first reference potential and a second reference potential. A triangular wave generation circuit, connected to the capacitor, generates a triangular wave signal by charging and discharging the capacitor. A first waveform shaping circuit, connected to the triangular wave generation circuit, converts the triangular wave signal based on the first reference potential to a first duty signal to control the first load. A second waveform shaping circuit, connected to the triangular wave generation circuit, converts the triangular wave signal based on the second reference potential to a second duty signal to control the second load. The potential converter generates the first and second reference potentials differently so that the first duty signal changes differently from the second duty signal.

A fifth aspect of the present invention is a system for controlling a first load and a second load. The system includes a first capacitor and a second capacitor. A first triangular wave generation circuit, connected to the first capacitor, generates a first triangular wave signal by charging and discharging the first capacitor. A second triangular wave generation circuit, connected to the second capacitor, generates a second triangular wave signal by charging and discharging the second capacitor. The second triangular wave signal has an amplitude that is the same as that of the first triangular wave signal. A potential converter generates a reference potential. A switch, connected to a voltage converter, determines a reference potential. A first waveform shaping circuit, connected to the potential converter and the first triangular wave generation circuit, converts the first triangular wave signal based on the reference potential to a first duty signal to control the first load. A second waveform shaping circuit, connected to the potential converter and the second triangular wave generation circuit, converts the second triangular wave signal based on the reference potential to a second duty signal to control the second load. The first triangular wave generation circuit changes at least one of a time constant for charging the first capacitor and a time constant for discharging the first capacitor so that the first duty signal changes differently from the second duty signal.

A sixth aspect of the present invention is a system for controlling a first load and a second load. The system includes a plurality of first capacitors, a second capacitor, and a potential converter for generating a reference potential. A plurality of first triangular wave generation circuits, each connected to an associated one of the first capacitors, generate a first triangular wave signal by charging and discharging the associated first capacitor. A second triangular wave generation circuit, connected to the second capacitor, generates a second triangular wave signal by charging and discharging the second capacitor. A switching circuit, connected to the first triangular wave generation circuits, selects one of the first triangular wave generation circuits in accordance with a switch signal to generate a selected one of the first triangular wave signals. A first waveform shaping circuit, connected to the potential converter and the switching circuit, converts the selected one of the first triangular wave signals based on the reference potential to a first duty signal to control the first load. A second waveform shaping circuit, connected to the potential converter, converts the second triangular wave signal based on the reference potential to a second duty signal to control the second load. The first triangular wave generation circuits each generate the first triangular wave signal with an amplitude differing from that of the second triangular wave signal. The switching circuit switches the selected one of the first triangular wave generation circuits so that the first duty signal changes differently from the second duty signal when the switch signal reaches a predetermined threshold value.

A seventh aspect of the present invention is a system for controlling a first load and a second load. The system includes a capacitor. A potential converter generates a first reference potential and a second reference potential. A switch, connected to a voltage converter, determines the first and second reference potentials. A triangular wave generation circuit, connected to the capacitor, generates a triangular wave signal by charging and discharging the capacitor. A first waveform shaping circuit, connected to the triangular wave generation circuit, for converts the triangular wave signal based on the first reference potential to a first duty signal to control the first load. A second waveform shaping circuit, connected to the triangular wave generation circuit, converts the triangular wave signal based on the second reference potential to a second duty signal to control the second load. The potential converter generates the first and second reference potentials differently so that the first duty signal changes differently from the second duty signal.

An eighth aspect of the present invention is a method for controlling a first load and a second load. The method includes generating a first triangular wave signal by charging and discharging a first capacitor, generating a second triangular wave signal by charging and discharging a second capacitor, generating a reference potential, converting the first triangular wave signal based on the reference potential to a first duty signal to control the first load, converting the second triangular wave signal based on the reference potential to a second duty signal to control the second load, and changing at least one of a time constant for charging the first capacitor and a time constant for discharging the first capacitor so that the first duty signal changes differently from the second duty signal.

A ninth aspect of the present invention is a method for controlling a first load and a second load. The method includes generating a reference potential, generating a plurality of first triangular wave signals by charging and discharging a plurality of first capacitors, generating a second triangular wave signal by charging and discharging a second capacitor, selecting one of the first triangular wave signals in accordance with a switch signal, converting the selected one of the first triangular wave signals based on the reference potential to a first duty signal to control the first load, and converting the second triangular wave signal based on the reference potential to a second duty signal to control the second load. The generating a plurality of first triangular wave signals includes generating the first triangular wave signals with an amplitude differing from that of the second triangular wave signal. The selecting one of the first triangular wave signals includes switching the selected one of the first triangular wave signals so that the first duty signal changes differently from the second duty signal when the switch signal reaches a predetermined threshold value.

A tenth aspect of the present invention is a method for controlling a first load and a second load. The method includes generating a first reference potential and a second reference potential, generating a triangular wave signal by charging and discharging a capacitor, converting the triangular wave signal based on the first reference potential to a first duty signal to control the first load, and converting the triangular wave signal based on the second reference potential to a second duty signal to control the second load. The generating a first reference potential and a second reference potential includes generating the first and second reference potentials differently so that the first duty signal changes differently from the second duty signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11 is a waveform diagram of a lamp triangular waveform signal generated by a lamp triangular waveform generation circuit according to a further embodiment of the present invention;

FIG. 12 is a waveform diagram showing a LED triangular wave signal generated by a LED triangular waveform generation circuit according to another embodiment of the present invention; and FIG. 13 is a table stored in a ROM of a reference potential input/output circuit according to still another embodiment of the present invention.

DETAILED DESCRIPTION OF THE PREFERRED EMBODIMENTS

Figure 1:
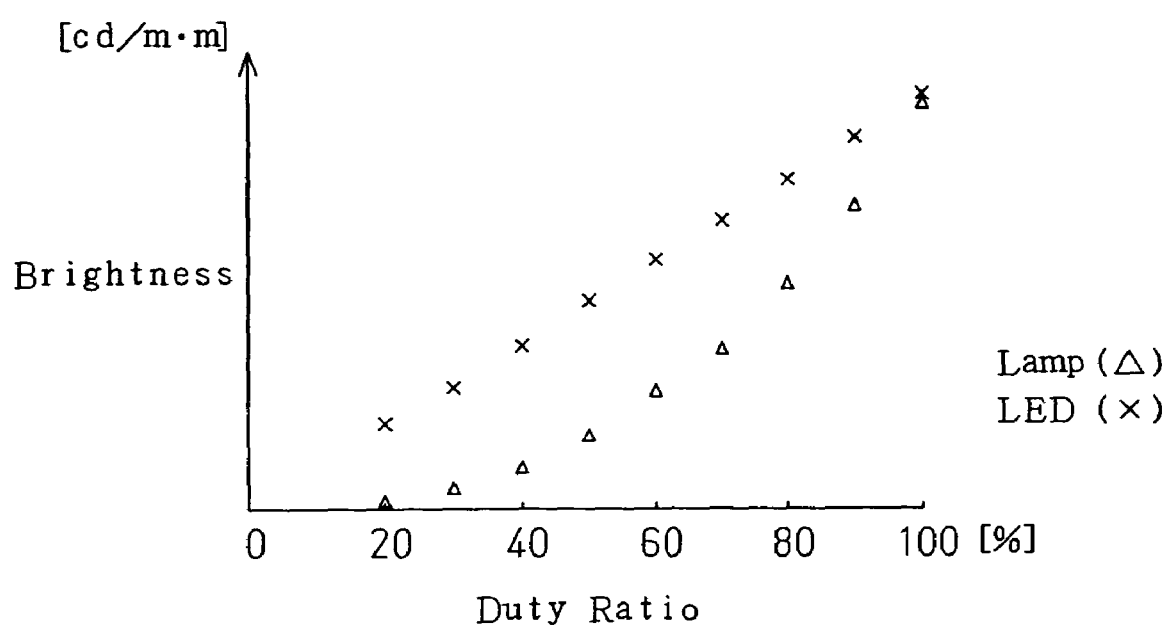
FIG. 1 is a graph showing the relationship between duty ratio and brightness for lamps and LEDs.

In the drawings, like numerals are used for like elements throughout.

[First Embodiment]

A load control circuit according to a first embodiment of the present invention will now be discussed with reference to FIGS. 2 to 5.

Figure 2:
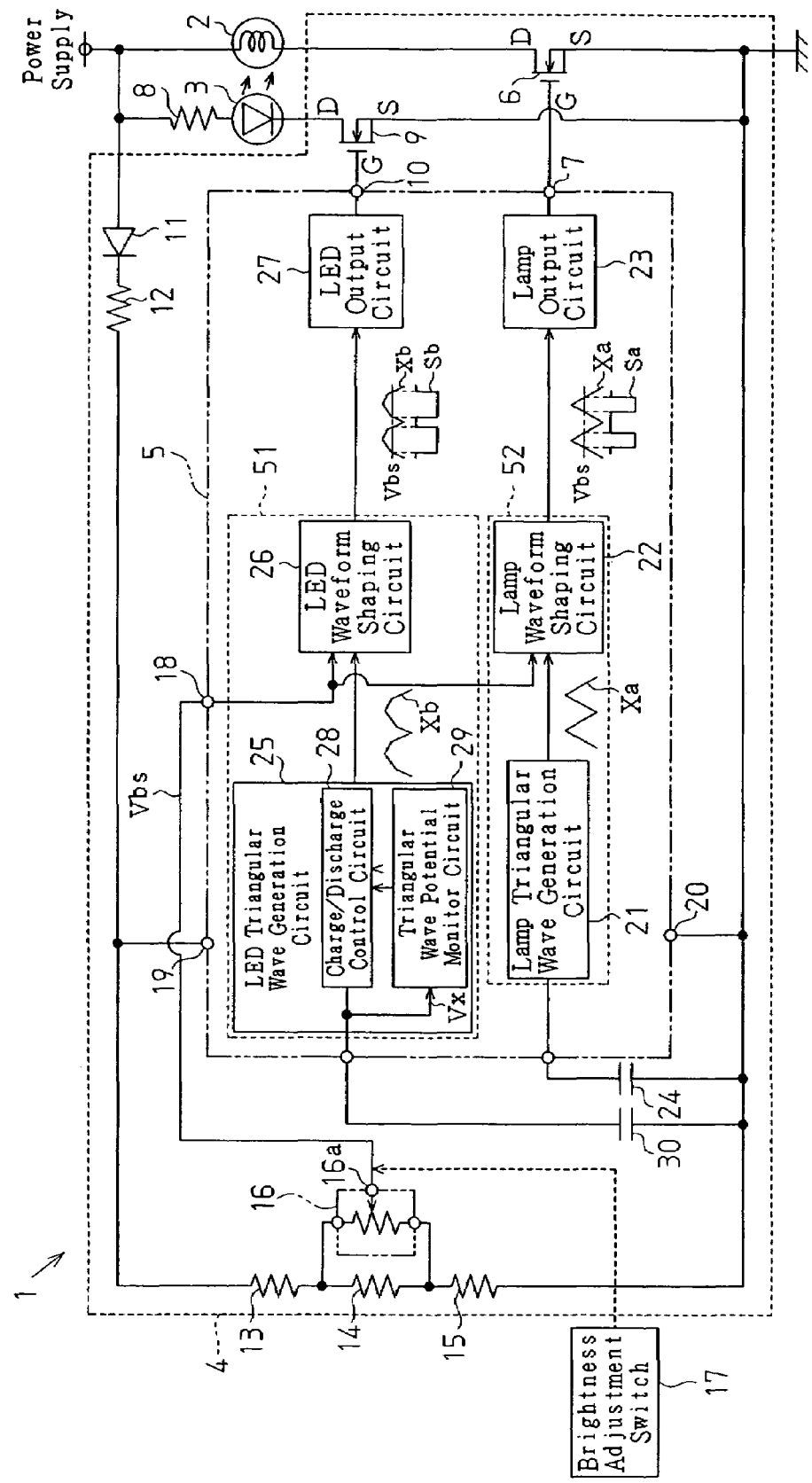
FIG. 2 is a block diagram showing the electric configuration of a vehicle light adjustment system according to a first embodiment of the present invention.

FIG. 2 is a block diagram showing the electric configuration of a vehicle light adjustment system 1. The vehicle light adjustment system 1 includes a plurality of LEDs 3 (first load), a plurality of lamps (second load) 2, a rheostat (light adjusting device) 4, and a brightness adjustment switch 17. For the sake of simplicity, only one lamp 2 and one LED 3 are shown in FIG. 2. Each lamp 2 illuminates a meter, such as a speedometer or a tachometer. Each LED 3 illuminates a switch, such as an air conditioner switch and a car stereo switch. The rheostat 4 controls the illumination of the lamp 2 and the LED 3. The rheostat 4 includes a duty ratio control circuit 5 (load control circuit) for generating a duty signal Sa, which drives the lamp 2, and a duty signal Sb, which drives the LED 3. The duty ratio control circuit 5 includes a lamp output terminal 7, a LED output terminal 10, a connection terminal 18, a power supply terminal 19, and a ground terminal 20.

The rheostat 4 includes transistors (MOSFETs) 6 and 9, each having a drain terminal, a gate terminal, and a source terminal. The lamp 2 includes a positive terminal, connected to a power supply, and a negative terminal, connected to the drain terminal of the transistor 6. The gate terminal of the transistor 6 is connected to the lamp output terminal 7 of the duty ratio control circuit 5. The source terminal of the transistor 6 is connected to the ground. The LED 3 includes an anode terminal, connected to the power supply via a resistor 8, and a cathode terminal, connected to the drain terminal of the transistor 9. The gate terminal of the transistor 9 is connected to the LED output terminal 10 of the duty ratio control circuit 5. The source terminal of the transistor 9 is connected to the ground.

The rheostat 4 includes a diode 11 and four resistors 12 to 15, which are connected in series between the power supply and the ground, and a variable resistor 16, which is connected parallel to the resistor 14. Further, the variable resistor 16 is connected to a brightness adjustment switch 17. The variable resistor 16 includes a slide terminal 16a that moves in accordance with the operation (rotational operation) of the brightness adjustment switch 17. The resistance of the variable resistor 16 changes in accordance with the operated amount of the brightness adjustment switch 17, that is, the moved amount (set amount) of the slide terminal 16a. The slide terminal 16a of the variable resistor 16 is connected to the connection terminal 18 of the duty ratio control circuit 5. Accordingly, the variable resistor 16 supplies the connection terminal 18 with a reference potential Vbs, which is in accordance with the resistance of the variable resistor 16.

In the duty ratio control circuit 5, the power supply terminal 19 is connected to the power supply, and the ground terminal 20 is connected to the ground. The duty ratio control circuit 5 includes a lamp triangular wave generation circuit 21 (second triangular wave generation circuit), a lamp waveform shaping circuit 22 (second waveform shaping circuit), and a lamp output circuit 23. The lamp triangular wave generation circuit 21 and the lamp waveform shaping circuit 22 configure a second duty signal generation circuit 52. A capacitor 24 is connected between the lamp triangular wave generation circuit 21 and the ground. The lamp triangular wave generation circuit 21 charges the capacitor 24 to increase the output potential and discharges the capacitor to decrease the output potential. Further, the lamp triangular wave generation circuit 21 charges and discharges the capacitor 24 to generate a lamp triangular wave signal Xa, which is a saw tooth wave, as shown in FIG. 2. The lamp triangular wave generation circuit 21 then provides the lamp triangular wave signal Xa to the lamp waveform shaping circuit 22. The potential at the capacitor 24 corresponds to the potential of the lamp triangular waveform signal Xa.

The lamp waveform shaping circuit 22, which is connected to the connection terminal 18, receives the reference potential Vbs from the variable resistor 16. Further, the lamp waveform shaping circuit 22 compares the lamp triangular wave signal Xa with the reference potential Vbs. The lamp waveform shaping circuit 22 generates a high signal when the potential of the lamp triangular wave signal Xa is less than the reference potential Vbs (Xa<Vbs) and generates a low signal when the potential of the lamp triangular wave signal Xa is greater than or equal to the reference potential Vbs (Xa≧Vbs). In this manner, the lamp waveform shaping circuit 22 generates the lamp duty signal Sa. The lamp duty signal Sa has a duty ratio corresponding to the value of the reference potential Vbs. The reference potential Vbs is determined in accordance with the operated amount of the brightness adjustment switch 17 (resistance of variable resistor 16). Accordingly, the duty ratio of the lamp duty signal Sa is determined in accordance with the operated amount of the brightness adjustment switch 17.

The lamp waveform shaping circuit 22 provides the lamp duty signal Sa, which controls the transistor 6, to the gate terminal of the transistor 6 via the lamp output circuit 23. Current corresponding to the duty ratio of the lamp duty signal Sa flows between the drain and source terminals of the transistor 6. Accordingly, the lamp 2 is illuminated with a brightness corresponding to the duty ratio of the lamp duty signal Sa. The lamp 2 has a characteristic in which the brightness increases along a parabolic line when the duty ratio increases (see FIG. 1).

The duty ratio control circuit 5 includes a LED triangular wave generation circuit 25 (first triangular wave generation circuit), a LED waveform shaping circuit 26 (first waveform shaping circuit), and a LED output circuit 27. The LED triangular wave generation circuit 25 and the LED waveform shaping circuit 26 configure a first duty signal generation circuit 51. The LED waveform shaping circuit 26 is connected to the connection terminal 18 so as to use the variable resistor 16 with the lamp waveform shaping circuit 22. Thus, the same reference potential Vbs is provided to the lamp waveform shaping circuit 22 and the LED waveform shaping circuit 26.

To illuminate the lamp 2 and the LED 3 with substantially the same brightness even if the lamp 2 and the LED 3 share the variable resistor 16, in the first embodiment, the LED triangular wave generation circuit 25 provides the LED waveform shaping circuit 26 with a LED triangular wave signal Xb, which has a waveform differing from that of the lamp triangular waveform signal Xa. The LED triangular wave generation circuit 25 includes a charge/discharge control circuit 28 and a triangular wave potential monitor circuit 29. A capacitor 30 is connected between the charge/discharge control circuit 28 and the ground. The lamp triangular wave signal Xa corresponds to the second triangular wave signal, and the LED triangular wave signal Xb corresponds to the first triangular wave signal.

Figure 3:
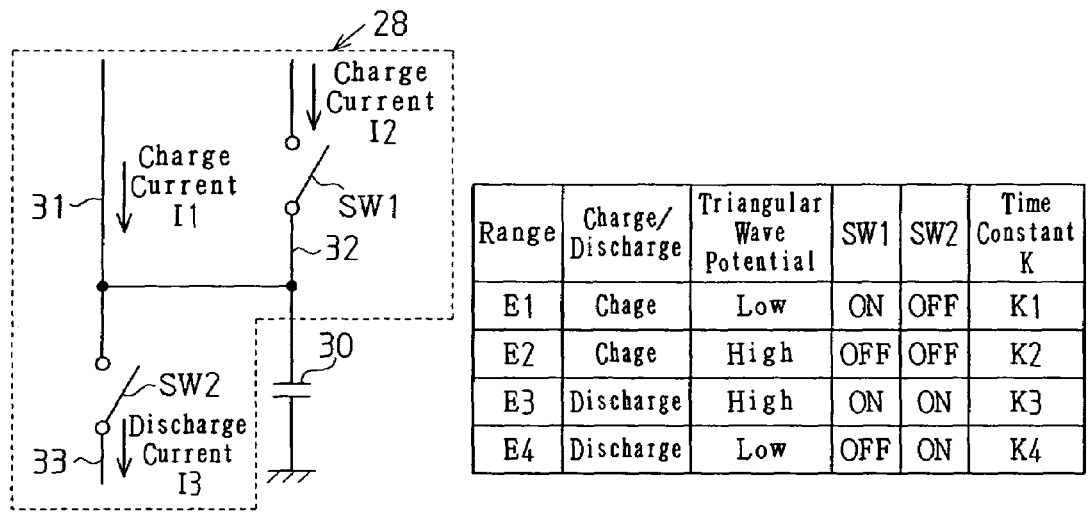
FIG. 3 is a circuit diagram showing the internal configuration of a charge/discharge control circuit together with its operation chart.
Figure 4:
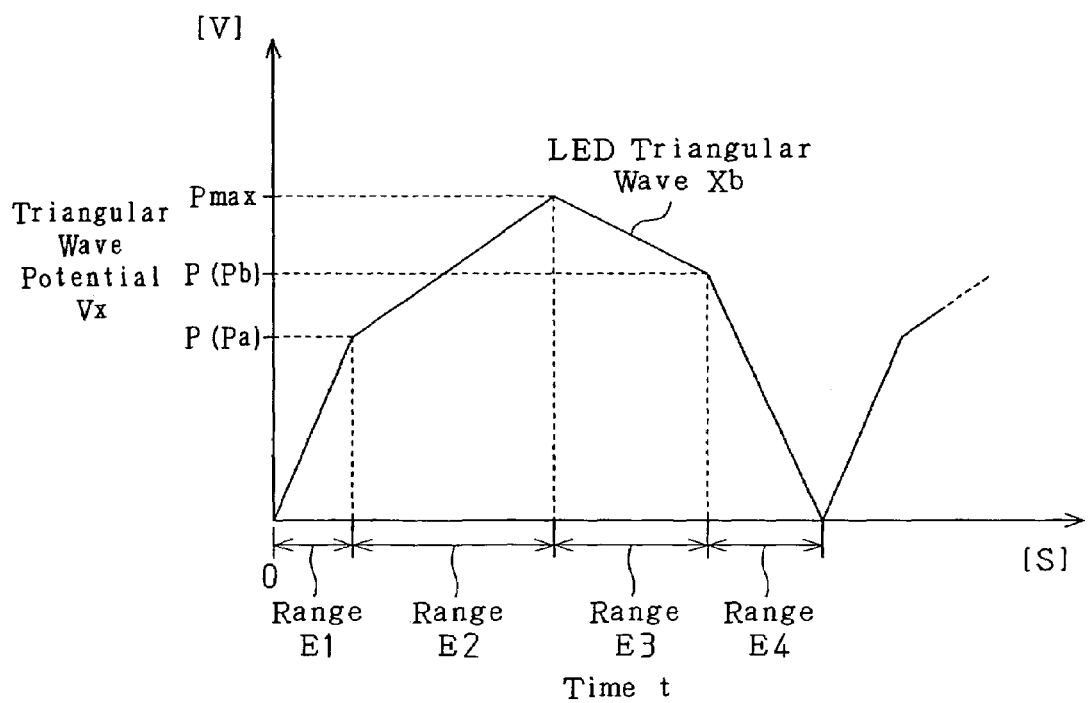
FIG. 4 is a waveform diagram showing a LED triangular wave signal generated by a LED triangular wave generation circuit.

Referring to FIG. 3, the charge/discharge control circuit 28 has two charge routes 31 and 32 for supplying charge current and discharge current from an internal circuit (not shown) to the capacitor 30. The charge route 32 includes a switch SW1. The charge/discharge control circuit 28 has the discharge route 33, which includes a switch SW2 connected parallel to the capacitor 30. The triangular wave potential monitor circuit 29 monitors the potential at the capacitor 30, that is, the potential of the LED triangular wave signal Xb. The triangular wave potential monitor circuit 29 controls the switches SW1 and SW2 in accordance with the triangular wave potential Vx of the LED triangular wave signal Xb. The triangular wave potential monitor circuit 29 stores a polarity changing point P (polarity changing potential), which is shown in FIG. 4, as a timing for changing a time constant K for charging and discharging the capacitor 30.

Figure 5:
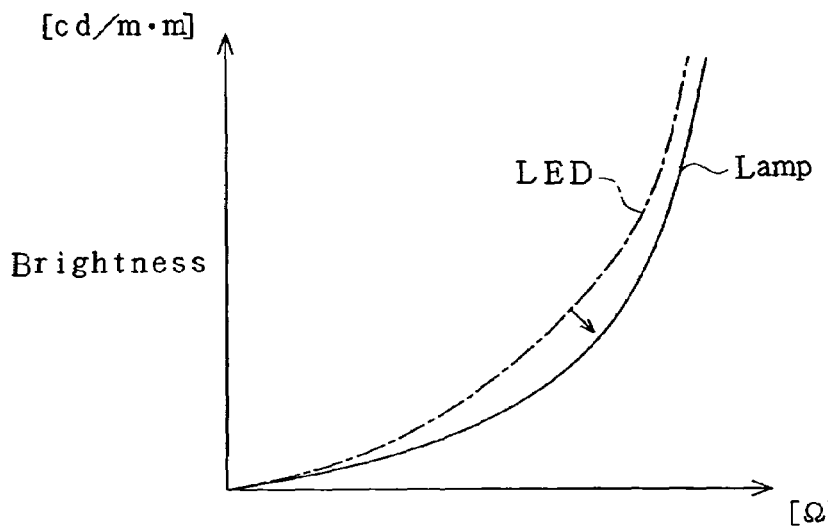
FIG. 5 is a graph showing the relationship between resistance of a variable resistor and brightness.

The polarity changing point P is determined in accordance with the relationship of brightness and duty ratio for the lamp 2 and the LED 3 and is calculated beforehand through measurements. In the first embodiment, to change the time constant K for charging and discharging, the triangular wave potential monitor circuit 29 stores a charge polarity changing point Pa and a discharge polarity changing point Pb. FIG. 5 shows the relationship between brightness and the resistance of the variable resistor 16 (operated amount of brightness adjustment switch 17). The polarity changing points Pa and Pb are set so that the brightness characteristic of the LED 3 approaches that of the lamp 2.

The triangular wave potential monitor circuit 29 compares the triangular wave potential Vx with the polarity changing point P (Pa and Pb). Based on the comparison result, the triangular wave potential monitor circuit 29 switches the switches SW1 and SW2 and changes the charge/discharge time constant K for generating the LED triangular wave signal Xb during charging and discharging. In this manner, the LED triangular wave generation circuit 25 generates the LED triangular wave signal Xb, which has a waveform differing from that of the lamp triangular signal Xa, and provides the LED triangular wave signal Xb to the LED waveform shaping circuit 26. The LED triangular wave signal Xb has the same cycle and the same amplitude as the lamp triangular wave signal Xa. The LED waveform shaping circuit 26 compares the LED triangular waveform signal Xb with the reference potential Vbs to generate the LED duty signal Sb, which has a duty ratio differing from that of the lamp duty signal Sa.

The LED waveform shaping circuit 26 provides the LED duty signal Sb, which controls the transistor 9, to the gate terminal of the transistor 9 via the LED output circuit 27. Current corresponding to the duty ratio of the LED duty signal Sb flows between the drain and source terminals of the transistor 9. Accordingly, the LED 3 is illuminated with a brightness corresponding to the duty ratio of the LED duty signal Sb, or substantially the same brightness as the lamp 2.

The operation of the vehicle light adjustment system 1 will now be discussed. When the headlights are turned on, the lamp triangular wave generation circuit 21 starts charging the capacitor 24, and the LED triangular wave generation circuit 25 starts charging the capacitor 30. To activate the lamp 2, the lamp triangular wave generation circuit 21 generates the saw tooth lamp triangular wave signal Xa by repeating the charging and discharging of the capacitor 24. The lamp waveform shaping circuit 22 compares the triangular wave signal Xa with the reference potential Vbs to convert the triangular wave signal Xa to the lamp duty signal Sa. The transistor 6 is driven based on the lamp duty signal Sa, and the lamp 2 is illuminated with a brightness based on the operated amount of the brightness adjustment switch 17.

Referring to the table of FIG. 3, to activate the LED 3, when the headlights are turned on, the triangular wave potential monitor circuit 29 activates the switch SW1 and deactivates the switch SW2 to charges the capacitor 24. When a period from when charging is started to when reaching the polarity changing point Pa during charging, that is, in range E1, the triangular wave potential monitor circuit 29 supplies the capacitor 30 with current obtained by adding the charge current I2 flowing through the charge route 32 to the charge current I1 flowing through the charge route 31. Accordingly, the time constant K of range E1 is set to value K1, which is based on current value (I1+I2) and which is a relatively high charging speed (value of which potential changing rate is large).

When the triangular wave potential Vx increases and reaches the polarity changing point Pa, the triangular wave potential monitor circuit 29 deactivates the switch SW1. In this manner, the triangular wave potential monitor circuit 29 supplies the capacitor 30 with only charge current I1 in range E2, which corresponds to a range from the polarity changing point Pa to the charge/discharge switching point Pmax. Accordingly, the time constant K of range E2 is set to value K2 (K2<K1), which is based on the charge current I1 and which is a relatively low charging speed (value of which potential changing rate is small). As a result, the waveform of the LED triangular wave signal Xb is plotted along a curve of which inclination decreases in a stepped manner as the capacitor 30 is charged.

Upon completion of the charging of the capacitor 30, the triangular wave potential monitor circuit 29 activates both of the switches SW1 and SW2 to discharge the capacitor 30. In range E3, corresponding to the range from the charge/discharge switching point Pmax to the polarity changing point Pb, the triangular wave potential monitor circuit 29 supplies the capacitor 30 with current obtained by subtracting the charge currents I1 and I2 from the discharge current I3 flowing through the discharge route 33. Accordingly, the time constant K of range E3 is set to value K3, which is based on current value (I3−I1−I2) and which is a relatively low discharging speed (value of which potential changing rate is small).

When the triangular wave potential Vx decreases and reaches the polarity changing point Pb, the triangular wave potential monitor circuit 29 deactivates the switch SW1. In this manner, in range E4 corresponding to the range from the polarity changing point Pb to the discharge completion point, the triangular wave potential monitor circuit 29 supplies the capacitor 30 with current obtained by subtracting the charge current I1 form the discharge current I3. Accordingly, the time constant K of range E4 is set to value K4 (|K4|>|K3|), which is based on current value (I3−I1) and which is a relatively high discharging speed (value of which potential changing rate is large). As a result, the waveform of the LED triangular wave signal Xb is plotted along a curve of which inclination increases in a stepped manner as the capacitor 30 is discharged.

In this manner, the LED triangular wave generation circuit 25 generates the LED triangular wave signal Xb of which potential changing rate is relatively large when the triangular wave potential Vx is relatively low and of which potential changing rate is relatively small when the triangular wave potential Vx is relatively high. Accordingly, the LED waveform shaping circuit 26 generates the LED duty signal Sb of which duty ratio changing rate is relatively small when the reference potential Vbs is relatively low and of which duty ratio changing rate is relatively large when the reference potential Vbs is relatively high. The rheostat 4 uses such LED duty signal Sb to control the transistor 9 and light the LED 3. Accordingly, the LED 3 and the lamp 2 are illuminated with substantially the same brightness.

In the first embodiment, the time constant K decreases when the capacitor 30 is being charged and the time constant K increases when the capacitor 30 is being discharged. As a result, the changing rate of the duty ratio of the generated LED duty signal Sb is relatively small when the reference potential Vbs is relatively low and relatively large when the reference potential Vbs is relatively high. Accordingly, even if the lamp 2 and the LED 3 share the same variable resistor 16, the brightness of the LED 3 is matched with the brightness of the lamp 2. Thus, the lamp 2 and the LED 3 are illuminated with substantially the same brightness.

The rheostat 4 including the duty ratio control circuit 5 of the first embodiment has the advantages described below.

(1) The LED triangular wave generation circuit 25 generates the LED triangular wave signal Sb, which changes in two stages during both charging and discharging of the capacitor 30. Accordingly, even if the lamp waveform shaping circuit 22 and the LED waveform shaping circuit 26 receive the same reference potential Vbs since they share the same variable resistor 16, the rheostat 4 adjusts the brightness of the LED 3 to match the brightness of the lamp 2. Thus, the variable resistor 16 does not have to be prepared separately for the lamp 2 and the LED 3. That is, there is no need to prepare more than one variable resistor 16. This enables the size of the rheostat 4 and ultimately the vehicle light adjustment system 1 to be reduced.

(2) The duty ratio control circuit 5 changes the time constant K during both charging and discharging. Accordingly, the brightness characteristic (relationship between the resistance of the variable resistor 16 and the brightness) of the LED 3 is further adjusted to match the brightness of the lamp 2. That is, the brightness of the LED 3 is further adjusted to match to brightness of the lamp 2.

(3) The rheostat 4 matches the brightness of the LED 3 with the brightness of the lamp 2. In this case, the duty ratio of the LED duty signal Sb is smaller in comparison to a normal state (i.e., when the lamp triangular wave generation circuit 21 and the LED triangular wave generation circuit 25 generate triangular wave signals having the same waveform). Accordingly, the power that is necessary when generating the duty signal is less than normal.

(4) The triangular wave potential monitor circuit 29 monitors the triangular wave potential Vx, which is generated by the charge/discharge control circuit 28. When the triangular wave potential Vx reaches the polarity changing point P (Pa and Pb), the triangular wave potential monitor circuit 29 changes the time constant K. In other words, the timing for changing the time constant K is determined based on the triangular wave potential Vx. In this case, the time constant is changed with higher accuracy in comparison to when the time constant K is changed after a predetermined time elapses.

[Second Embodiment]

A second embodiment of the present invention will now be discussed with reference to FIGS. 6 to 8. The second embodiment differs from the first embodiment only in how the LED triangular wave signal is output.

Figure 7:
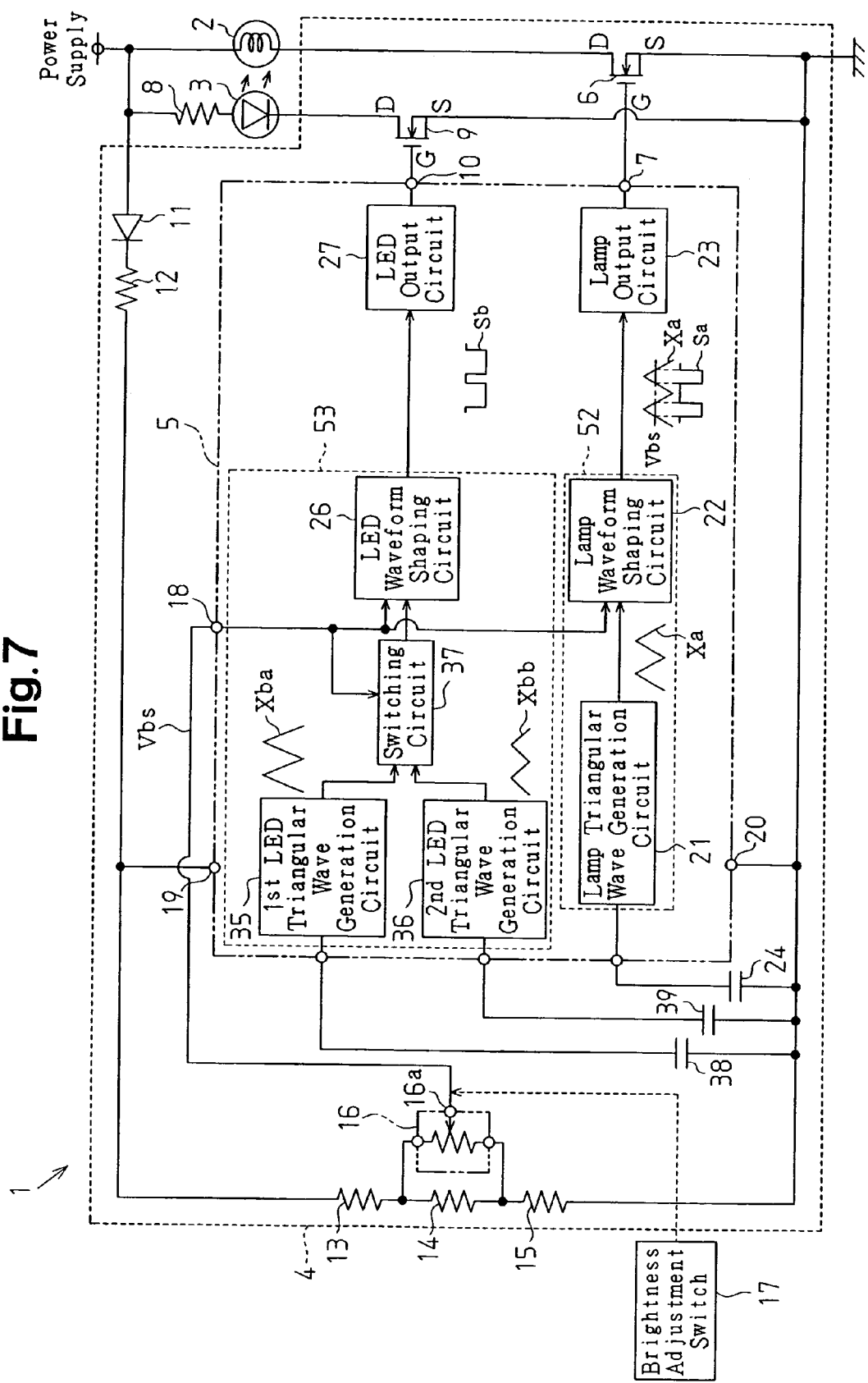
FIG. 7 is a block diagram showing the electric configuration of a vehicle light adjustment system.

FIG. 7 is a block diagram showing the electric configuration of the vehicle light adjustment system 1. The duty ratio control circuit 5 includes a first LED triangular wave generation circuit 35, a second LED triangular wave generation circuit 36, and a switching circuit 37. A capacitor 38 is connected between the first LED triangular wave generation circuit 35 and the ground. A capacitor 39 is connected between the second LED triangular wave generation circuit 36 and the ground. The output of the first LED triangular wave generation circuit 35 and the output of the second LED triangular wave generation circuit 36 are connected to the switching circuit 37. The switching circuit 37 is connected to the LED waveform shaping circuit 26. Further, the switching circuit 37 is connected to the variable resistor 16 via the connection terminal 18. The first LED triangular wave generation circuit 35, the second LED triangular wave generation circuit 36, the switching circuit 37, and the LED waveform shaping circuit 26 configure a first duty signal generation circuit 53.

The first LED triangular wave generation circuit 35 generates a first LED triangular wave signal Xba having an amplitude differing from that of the lamp triangular wave signal Xa. The second LED triangular wave generation circuit 36 generates a second LED triangular wave signal Xbb having an amplitude differing from that of the lamp triangular wave signal Xa and the first LED triangular wave signal Xba. Referring to FIG. 8, the first LED triangular wave signal Xba has the same cycle as the lamp triangular wave signal Xa and a greater amplitude than the lamp triangular wave signal Xa. The duty ratio control circuit 5 changes the time constant for charging and discharging the capacitor 38 so that the amplitude of the first LED triangular wave signal Xba becomes greater than the amplitude of the lamp triangular wave signal Xa. Further, the bottom value (i.e., minimum value) of the first LED triangular wave signal Xba is set to be the same as the bottom value of the lamp triangular wave signal Xa.

Figure 8:
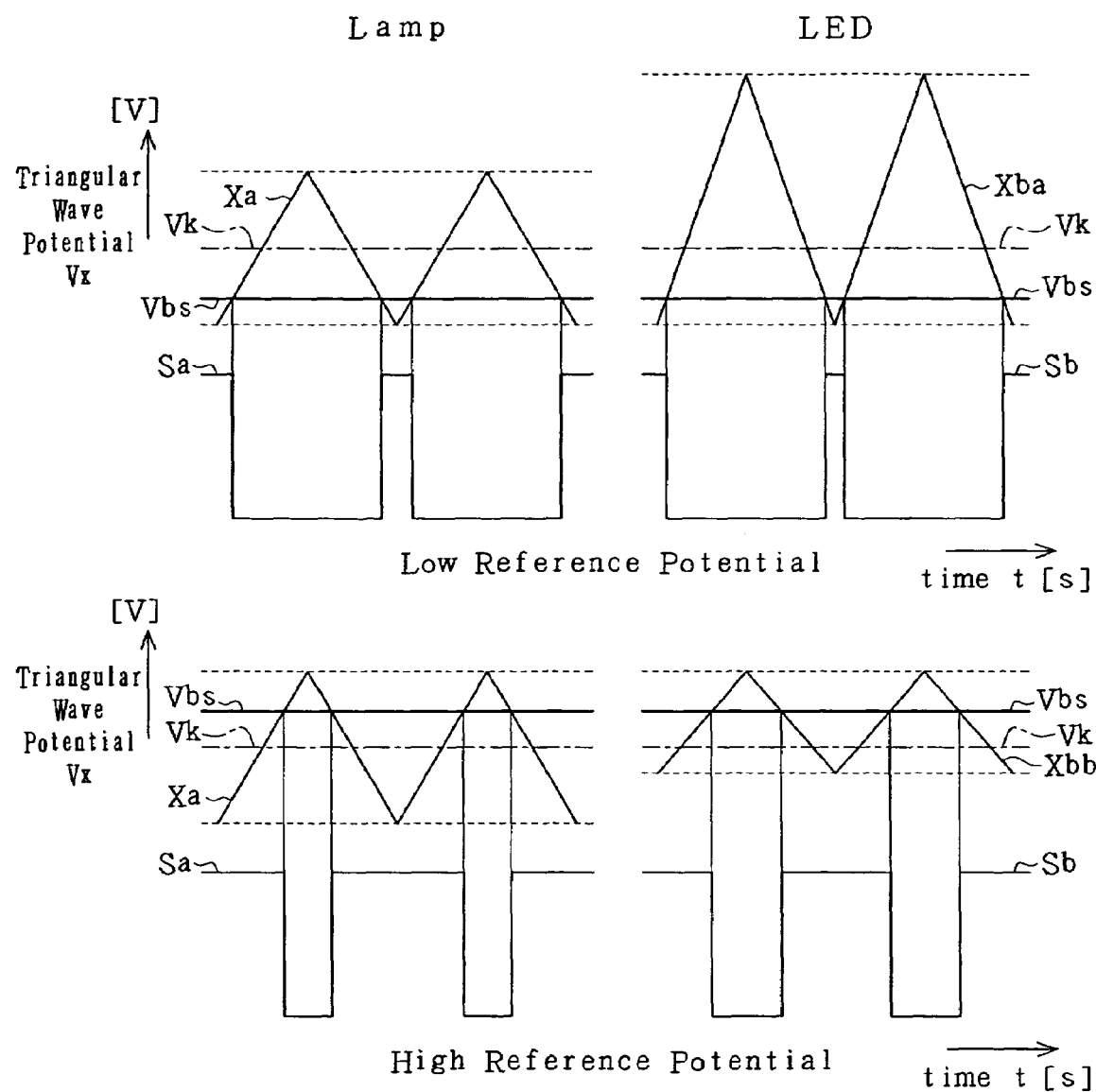
FIG. 8 is a waveform chart showing the relationship between a triangular wave signal and duty ratio.

As shown in FIG. 8, the second LED triangular wave signal Xbb has the same cycle as the lamp triangular wave signal Xa but has an amplitude that is smaller than that of the lamp triangular wave signal Xa. The duty ratio control circuit 5 changes the time constant for charging and discharging the capacitor 39 so that the amplitude of the second LED triangular wave signal Xbb becomes smaller than the amplitude of the lamp triangular wave signal Xa. The LED triangular wave signal Xbb is shifted to the high potential side (upper side with respect to the amplification direction) so that the peak value of the second LED triangular wave signal Xbb (i.e., waveform peak) is the same as the peak value of the lamp triangular wave signal Xa.

The switching circuit 37 includes various devices, such as a switch element and a comparator. The switching circuit 37 receives the first LED triangular wave signal Xba, the second LED triangular wave signal Xbb, and the reference potential Vbs and switches the triangular wave generation circuit that is used based on the reference potential Vbs. The switching circuit 37 sequentially monitors the reference potential Vbs. The switching circuit 37 uses the first LED triangular wave generation circuit 35 until the reference potential Vbs reaches the threshold value Vk. If the reference potential Vbs reaches the threshold value Vk (Vbs≧Vk), the switching circuit 37 switches the triangular wave generation circuit that is used to the second LED triangular wave generation circuit 36. As a result, the switching circuit 37 outputs the first LED triangular wave signal Xba if the reference potential Vbs is less than the threshold value Vk and outputs the second LED triangular wave signal Xbb if the reference potential Vbs is greater than or equal to the threshold value Vk. The threshold value Vk is set so that the illumination state of the LED 3 follows that of the lamp 2. For example, the threshold value Vk is set to a value of 50% of the reference potential Vbs.

The LED waveform shaping circuit 26 compares the first LED triangular waveform signal Xba or the second LED triangular waveform signal Xbb with the reference potential Vbs to generate a LED duty signal Sb having a duty ratio differing from that of the lamp duty signal Sa and provides the LED duty signal Sb to the gate terminal of the transistor 9. The transistor 9 is driven in accordance with the LED duty signal Sb. The LED 3 is illuminated with a brightness corresponding to the duty ratio of the LED duty signal Sb, that is, with a brightness that is substantially the same as the lamp 2.

Figure 6:
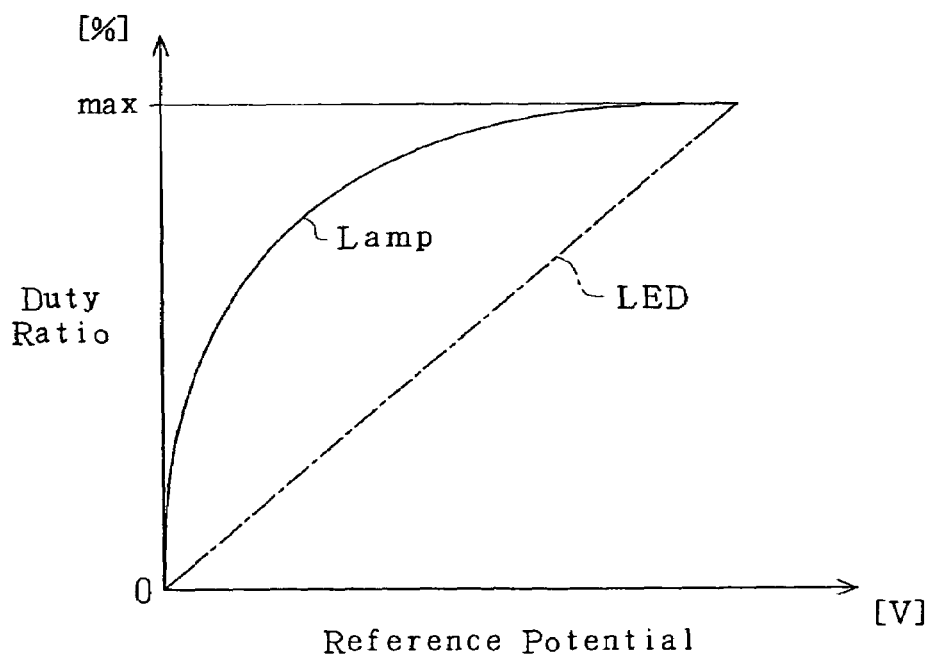
FIG. 6 is a graph showing the relationship between reference potential and duty ratio in accordance with a second embodiment of the present invention.

To have the brightness of the LED 3 follow the brightness of the lamp 2, the duty ratio of the LED duty signal Sb must be changed in accordance with the reference potential determined by the variable resistor 16 as shown FIG. 6. In other words, the waveform of the LED duty signal Sb has a duty ratio that changes so that the brightness of the LED 3 follows the brightness of the lamp 2. Charging/discharging time constants are set to generate the first LED triangular wave signal Xba and the second LED triangular wave signal Xbb so that such a LED duty signal Sb is generated. Further, the waveforms of the first and second LED triangular wave signals Xba and Xbb are set so that when the switching circuit 37 switches the triangular wave generation circuit that is used, the duty ratio is the same before and after the switching.

When the headlights are turned on, the lamp triangular wave generation circuit 21 starts charging or discharging the capacitor 24, the first LED triangular wave generation circuit 35 starts charging or discharging the capacitor 38, and the second LED triangular wave generation circuit 36 starts charging or discharging the capacitor 39. In relation with the lamp 2, the lamp triangular wave generation circuit 21 repeats the charging and discharging of the capacitor 24 to generate the saw tooth lamp triangular wave signal Xa, which is provided to the lamp waveform shaping circuit 22. The lamp waveform shaping circuit 22 compares the triangular wave signal Xa with the reference potential Vbs and converts the triangular wave signal Xa to the lamp duty signal Sa. The transistor 6 is driven based on the lamp duty signal Sa, and the lamp 2 is illuminated with a brightness based on the operated amount of the brightness adjustment switch 17.

With regard to the LED 3, when the headlights are turned on, the first LED triangular wave generation circuit 35 repeats the charging and discharging of the capacitor 38 to generate the saw tooth first LED triangular wave signal Xba, which is provided to the switching circuit 37. At the same time, the second LED triangular wave generation circuit 36 repeats the charging and discharging of the capacitor 39 to generate the saw tooth second LED triangular wave signal Xbb, which is provided to the switching circuit 37. When the reference potential Vbs is less than the threshold value Vk, the switching circuit 37 sets the first LED triangular wave generation circuit 35 as the triangular wave generation circuit that is used and provides the first LED triangular wave signal Xba to the LED waveform shaping circuit 26. Based on the first LED triangular wave signal Xba and the reference potential Vbs, the LED waveform shaping circuit 26 generates the LED duty signal Sb, which is provided to the transistor 9.

The changing rate for the potential of the first LED triangular wave signal Xba is relatively large. Thus, the change in the duty ratio of the duty signal Sb with respect to the change in the reference potential Vbs is relatively small. The LED 3 is driven in accordance with such LED duty signal Sb. Thus, the brightness of the LED 3 follows the brightness of the lamp 2.

Afterwards, as the reference potential Vbs increases in accordance with the operation of the brightness adjustment switch 17, the reference potential Vbs reaches the threshold value Vk. Then, the switching circuit 37 switches the triangular wave generation circuit that is used to the second LED triangular wave generation circuit 36 and provides the second LED triangular wave signal Xbb to the LED waveform shaping circuit 26. The LED waveform shaping circuit 26 generates the LED duty signal Sb, which is based on the second LED triangular wave signal Xbb and the reference potential Vbs, and provides the LED duty signal Sb to the transistor 9. The changing rate for the potential of the second LED triangular wave signal Xbb is relatively small. Thus, the change in duty ratio of the duty signal Sb relative to the change in the reference potential Vbs is relatively large. The LED 3 is driven in accordance with such LED duty signal Sb. Accordingly, the brightness of the LED 3 follows the brightness of the lamp 2.

As the reference potential Vbs decreases in accordance with the operation of the brightness adjustment switch 17, the reference potential Vbs becomes lower than the threshold value Vk. Then, the switching circuit 37 switches the triangular wave generation circuit that is used to the second LED triangular wave generation circuit 36 and provides the first LED triangular wave signal Xba to the LED waveform shaping circuit 26. The LED waveform shaping circuit 26 duty-converts the first LED triangular wave signal Xba, and the LED 3 is driven in accordance with the LED duty signal Sb.

The rheostat 4 of the second embodiment has the advantages described below.

(1) The bottom value of the first LED triangular wave signal Xba coincides with the bottom value of the lamp triangular wave signal Xa. Furthermore, the peak value of the second LED triangular wave signal Xbb coincides with the peak value of the lamp triangular wave signal Xa. Accordingly, the rheostat 4 illuminates the lamp 2 and the LED 3 with the same brightness when the operated amount of the brightness adjustment switch 17 is both minimum (i.e., the duty ratio of the duty signals Sa and Sb is 0%) and maximum (i.e., duty ratio of the duty signal Sa and Sb is 100%).

(2) The waveforms of the first LED triangular wave signal Xba and second LED triangular wave signal Xbb are set so that when the switching circuit 37 switches the triangular wave generation circuit that is used, the duty ratio of the LED duty signal Sb is the same immediately before and after the switching. For example, the triangular wave generation circuit that is used may be switched from the first LED triangular wave generation circuit 35 to the second LED triangular wave generation circuit 36. In such a case, the first LED triangular wave signal Xba and the second triangular wave signal Sbb are set so that the first LED triangular wave signal Xba immediately before the switching and the second LED triangular wave signal Xbb immediately after the switch have the same duty ratio. This prevents the duty ratio of the LED signal Sb from differing greatly when switching the triangular wave generation circuit that is used. Thus, a sudden change in the brightness of the LED 3 does not occur.

(3) The switching circuit 37 switches the triangular wave generation circuit that is used based on the reference potential Vbs. This provides a simplified configuration in comparison to when switching is performed by a switch command from the CPU.

[Third Embodiment]

A third embodiment of the present invention will now be discussed with reference to FIGS. 9 and 10. The third embodiment differs from the first and second embodiments only in how the LED triangular wave signal is output.

Figure 9:
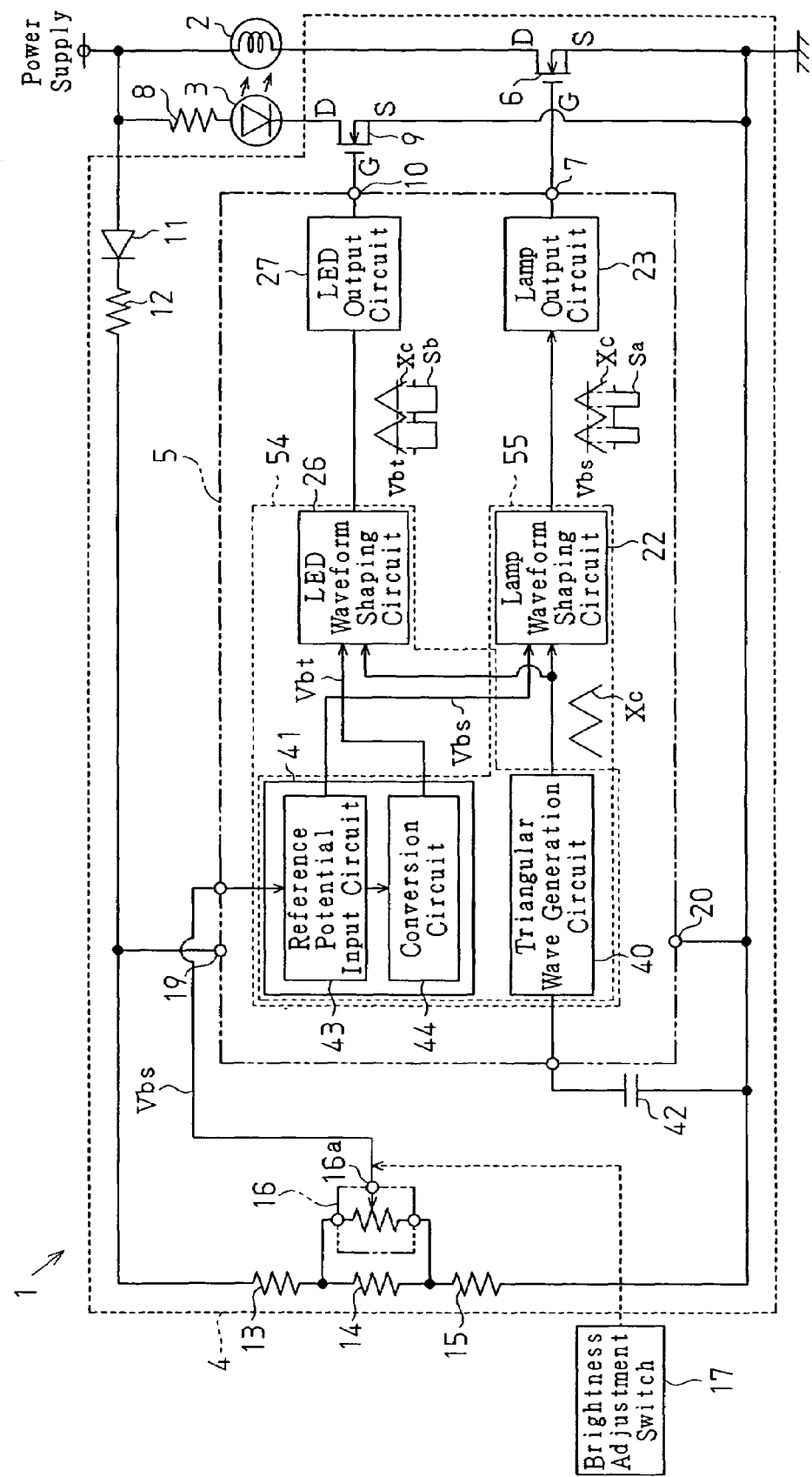
FIG. 9 is a block diagram showing the electric configuration of a vehicle light adjustment system according to a third embodiment of the present invention.

FIG. 9 is a block diagram showing the electric configuration of the vehicle light adjustment system 1. The duty ratio control circuit 5 includes a single triangular wave generation circuit 40 and a reference potential input/output circuit 41. The triangular wave generation circuit 40 is connected to the lamp waveform shaping circuit 22 and the LED waveform shaping circuit 26. Further, the triangular wave generation circuit 40 is shared by the lamp waveform shaping circuit 22 and the LED waveform shaping circuit 26. The triangular wave generation circuit 40, the reference potential input/output circuit 41, and the LED waveform shaping circuit 26 configure a first duty signal generation circuit 54. The triangular wave generation circuit 40, the reference potential input/output circuit 41, and the lamp waveform shaping circuit 22 configure a second duty signal generation circuit 55. A capacitor 42 is connected between the triangular wave generation circuit 40 and the ground. The triangular wave generation circuit 40 generates a triangular wave signal Xc that is provided to the lamp waveform shaping circuit 22 and the LED waveform shaping circuit 26.

The reference potential input/output circuit 41 supplies the lamp waveform shaping circuit 22 with reference potential Vbs and the LED waveform shaping circuit 26 with reference potential Vbt. The reference potentials Vbs and Vbt have different waveforms. The reference potential input/output circuit 41 includes a reference potential input circuit 43 and a conversion circuit 44. The reference potential input circuit 43 has an input connected to the variable resistor 16 and an output connected to the lamp waveform shaping circuit 22 and the conversion circuit 44. The conversion circuit 44 has an input connected to the reference potential input circuit 43 and an output connected to the LED waveform shaping circuit 26.

The reference potential input circuit 43 receives the reference potential Vbs from the variable resistor 16 and supplies the reference potential Vbs to the lamp waveform shaping circuit 22 and the conversion circuit 44. The lamp reference potential Vbs increases in proportion to the operated amount of the variable resistor 16 (operated amount of the brightness adjustment switch 17), as shown in FIG. 10. The lamp waveform shaping circuit 22 duty-converts the triangular wave signal Xc received from the triangular wave generation circuit 40 based on the lamp reference potential Vbs to generate a lamp duty signal Sa for driving the lamp 2.

Figure 10:
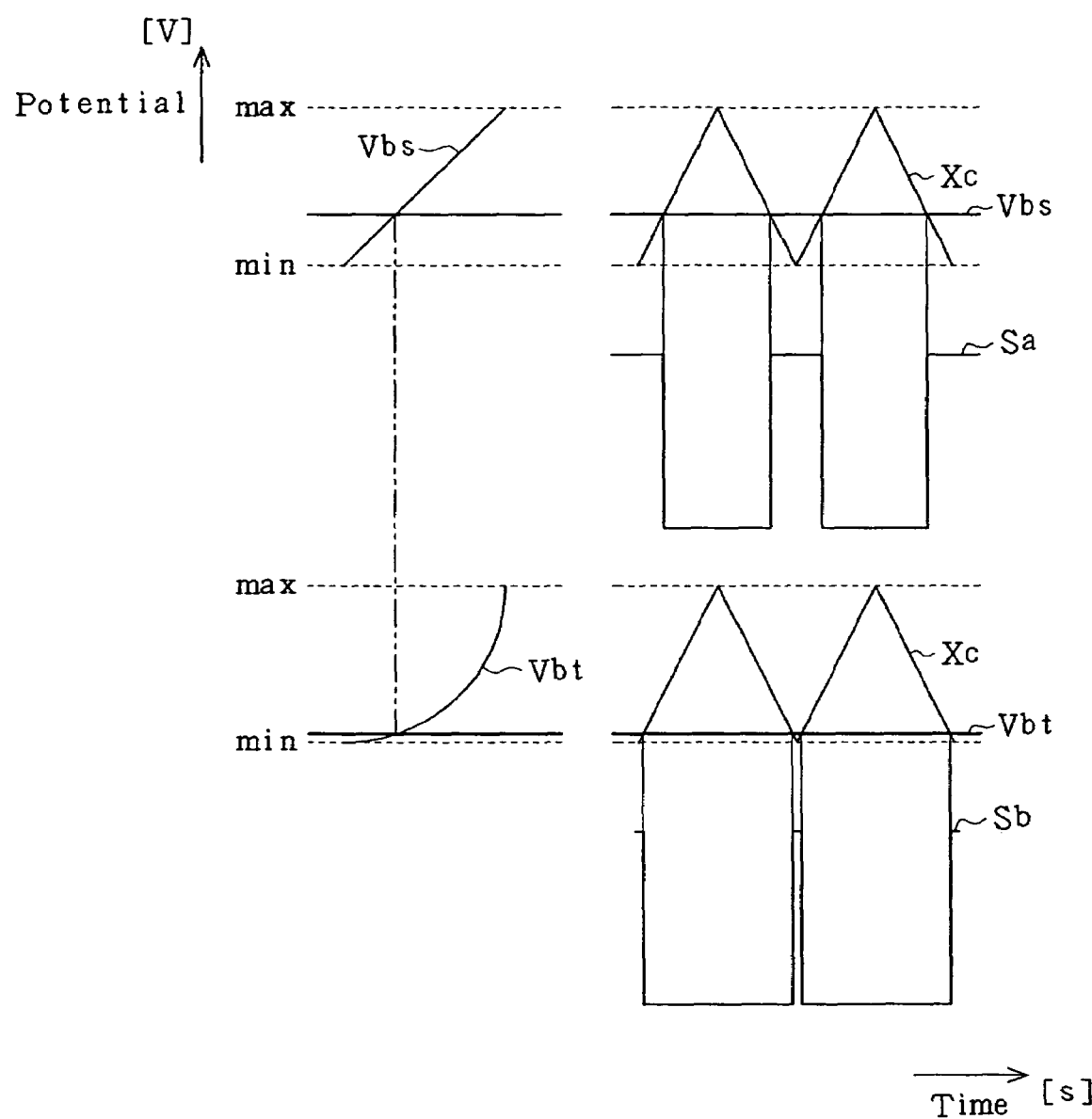
FIG. 10 is a waveform diagram showing the relationship between reference potential, triangular wave signal, and duty signal.

The conversion circuit 44 converts the reference potential Vbs received from the reference potential input circuit 43 to a LED reference potential Vbt, which changes in accordance with a quadratic curve shown in FIG. 10, and supplies the LED reference potential Vbt to the LED waveform shaping circuit 26. When the reference potential Vbs is relatively low, the changing rate of the LED reference potential Vbt is relatively small. As the reference potential Vbs increases, the changing rate of the LED reference potential Vbt increases. In other words, the potential waveform of the LED reference potential Vbt is set so that the brightness of the LED 3 follows that of the lamp 2 even if the variable resistor 16 is shared by the lamp 2 and the LED 3. For example, the conversion circuit 44 uses a antilogarithm (index) conversion to convert the reference potential Vbs to the LED reference potential Vbt. Based on the LED reference potential Vbt, the LED waveform shaping circuit 26 duty-converts the triangular wave signal Xc received from the triangular wave generation circuit 40 to generate the LED duty signal Sb for driving the LED 3. The lamp reference potential Vbs corresponds to a first reference potential, and the LED reference potential Vbt corresponds to a second reference potential.

When the headlights are turned on, the triangular wave generation circuit 40 starts charging or discharging the capacitor 42 to generate the triangular wave signal Xc. In this state, with regard to the lamp 2, the triangular wave signal Xc is provided to the lamp waveform shaping circuit 22, and the lamp reference potential Vbs, which corresponds to the operated amount of the variable resistor 16 (brightness adjustment switch 17), is provided from the reference potential input circuit 43 to the lamp waveform shaping circuit 22. The lamp waveform shaping circuit 22 compares the triangular wave signal Xc with the lamp reference potential Vbs to generate the lamp duty signal Sa. The transistor 6 is driven based on the lamp duty signal Sa and illuminated with a brightness that is in accordance with the operated amount of the brightness adjustment switch 17.

With regard to the LED 3, when the headlights are turned on, the triangular wave signal Xc is provided to the LED waveform shaping circuit 26. Further, the LED reference potential Vbt, which corresponds to the operated amount of the variable resistor 16 (operated amount of brightness adjustment switch 17), is provided from the conversion circuit 44 to the lamp waveform shaping circuit 22. The lamp waveform shaping circuit 22 compares the triangular wave signal Xc with the LED reference potential Vbt to generate the LED duty signal Sb. The transistor 9 is driven based on the LED duty signal Sb and illuminated with a brightness that is in accordance with the operated amount of the brightness adjustment switch 17.

A case in which the brightness adjustment switch 17 is operated will now be discussed. The conversion circuit 44 converts the lap reference potential Vbs to generate the LED reference potential Vbt. The LED waveform shaping circuit 26 uses the LED reference potential Vbt to generate the LED duty signal Sb. In this manner, the LED duty signal Sb is generated so that the brightness of the LED 3 follows the brightness of the lamp 2. Therefore, although only one variable resistor 16 is used, the change in the duty ratio differs between the lamp duty signal Sa and the LED duty signal Sb so that the brightness of the LED 3 follows the brightness of the lamp 2.

The rheostat 4 of the third embodiment has the advantages described below.

(1) The lamp waveform shaping circuit 22 and the LED waveform shaping circuit 26 share the triangular wave generation circuit 40. This minimizes the quantity of the triangular wave generation circuit 40 and reduces the size of the rheostat 4 and ultimately the vehicle light adjustment system 1.

(2) The lamp reference potential Vbs supplied to the lamp waveform shaping circuit 22 is a reference potential that is normally used. Accordingly, the duty ratio of the lamp duty signal Sa changes with respect to the operated amount of the variable resistor 16 (operated amount of the brightness adjustment switch 17) in the normal manner. Thus, the brightness of the lamp 2 changes in the normal manner.

(3) The LED reference potential Vbt is generated by converting the reference potential Vbs with the conversion circuit 44. That is, the LED reference potential Vbt is generated with hardware. In this case, in comparison to when the LED reference potential Vbt is generated with software, the configuration of the rheostat 4, and ultimately, the vehicle light adjustment system 1 is simplified.

It should be apparent to those skilled in the art that the present invention may be embodied in many other specific forms without departing from the spirit or scope of the invention. Particularly, it should be understood that the present invention may be embodied in the following forms.

In the first embodiment, the brightness of the LED 3 is matched with the brightness of the lamp 2. Instead, the brightness of the lamp 2 may be matched with the brightness of the LED 3. In this case, as shown in FIG. 11, the potential changing rate of the lamp triangular wave signal Xa is relatively small when the triangular wave potential Vx is low, and the potential changing rate of the lamp triangular wave signal Xa is relatively large when the triangular wave potential Vx is high. This structure may be applied to the second or third embodiment.

In the first embodiment, the polarity changing point P of the time constant K when the time constant K related with the lamp triangular wave signal Xa and the LED triangular wave signal Xb are changed does not have to be the only one value for each of charging and discharging. For example, as shown in FIG. 12, the time constant K may be changed at two values, each of charging and discharging. Further, the time constant K may be changed only during charging or only during discharging.

In the first embodiment, the time constant K is changed when the triangular wave potential Vx reaches the polarity changing point P. Instead, for example, the charging time or discharging time may be measured, and the time constant K may be changed when the elapsed time reaches a predetermined time.

In the second embodiment, there are two LED triangular wave generation circuits. However, there may be three or more LED triangular wave generation circuits. By using many LED triangular wave generation circuits, the LED duty signal Sb may be generated so that the brightness of the LED 3 further approaches the brightness of the lamp 2. This equalizes the brightness of the lamp 2 and the LED 3.

In the second embodiment, the switching circuit 37 may switch the triangular wave generation circuit that is used in accordance with an external signal other than the reference potential Vbs.

In the third embodiment, the LED reference potential Vbt may be generated with software instead of hardware. In this case, for example, the reference potential input/output circuit 41 includes a ROM for storing a table 45 shown in FIG. 13 to directly determine the LED reference potential Vbt from the lamp reference potential Vbs. The table 45 records the lamp reference potential Vbs, which is indicated by digital values a1, a2, and so on, and the LED reference potential Vbt, which is indicated by digital values b1, b2, and so on. When the rheostat 4 is driven, the reference potential input/output circuit 41 supplies the lamp waveform shaping circuit 22 with the lamp reference potential Vbs. The reference potential input/output circuit 41 also A/D converts the lamp reference potential Vbs and refers to the digital values (a1, a2, . . . ) of the table 45. Then, the reference potential input/output circuit 41 D/A converts the digital value (b1, b2, . . . ) of the obtained LED reference potential Vbt to generate the LED reference potential Vbt, which is supplied to the LED waveform shaping circuit 26. The desired LED reference potential Vbt is also obtained in this case.

In the third embodiment, the conversion circuit 44 does not necessarily have to perform antilogarithm conversion when generating the LED reference potential Vbt based on the lamp reference potential Vbs. As long as the LED duty signal Sb is such that the brightness of the LED 3 is capable of following the brightness of the lamp 2, the conversion method is not limited.

In the third embodiment, a normally used reference potential may be used as the lamp reference potential Vbs. Instead, the normally used reference potential may be converted to a predetermined value to generate the lamp reference potential Vbs.

In the first to third embodiments, the load (first load and second load) may be a device other than the lamp 2 and the LED 3.

The light adjustment systems of the first to third embodiments may be applied to a system other than one for a vehicle, such as a system for illuminating lamps and LEDs for household use.

In the first to third embodiments, the brightness of the LED 3 does not necessarily have to be matched with the brightness of the lamp 2. Different people see light differently. Thus, the duty ratio of the duty signal Sb may be changed to adjust the brightness of the LED 3 in accordance with the desired brightness.

The present examples and embodiments are to be considered as illustrative and not restrictive, and the invention is not to be limited to the details given herein, but may be modified within the scope and equivalence of the appended claims.

What is claimed is:

1. A load control circuit connected to a first capacitor, a second capacitor, a first load, and a second load, the load control circuit comprising:
    a first triangular wave generation circuit, connected to the first capacitor, for generating a first triangular wave signal by charging and discharging the first capacitor;
    a second triangular wave generation circuit, connected to the second capacitor, for generating a second triangular wave signal by charging and discharging the second capacitor, the second triangular wave signal having an amplitude that is the same as that of the first triangular wave signal;
    a potential converter for generating a reference potential;
    a first waveform shaping circuit, connected to the potential converter and the first triangular wave generation circuit, for converting the first triangular wave signal based on the reference potential to a first duty signal to control the first load; and
    a second waveform shaping circuit, connected to the potential converter and the second triangular wave generation circuit, for converting the second triangular wave signal based on the reference potential to a second duty signal to control the second load, the first triangular wave generation circuit changing at least one of a time constant for charging the first capacitor and a time constant for discharging the first capacitor so that the first duty signal changes differently from the second duty signal.

2. The load control circuit according to claim 1, wherein the first triangular wave generation changes the time constant for charging the first capacitor and the time constant for discharging the first capacitor.

3. The load control circuit according to claim 2, wherein the first triangular wave generation circuit changes the time constant for charging the first capacitor at least twice and the time constant for discharging the first capacitor at least twice.

4. The load control circuit according to claim 1, wherein the first triangular wave generation circuit includes:
    a charge/discharge control circuit for controlling the charging and discharging of the first capacitor; and
    a monitor circuit, connected to the charge/discharge control circuit, for monitoring potential of the first triangular wave signal, the monitoring circuit changing the at least one of the time constant for charging the first capacitor and the time constant for discharging the first capacitor when the potential of the first triangular wave signal reaches a predetermined value.

5. The load control circuit according to claim 4, wherein the charge control circuit includes:
    a first switch, connected to the first capacitor, for selectively opening and closing a charge route extending to the first capacitor; and
    a second switch, connected to the first capacitor, for selectively opening and closing a discharge route extending from the first capacitor.

6. The load control circuit according to claim 1, wherein the first load includes one of a lamp and a LED, and the second load includes the other one of the lamp and the LED.

7. The load control circuit according to claim 6, wherein the load control circuit is connected to a switch for changing brightness of the lamp and the LED; and the first triangular wave generation circuit changes the time constant for charging and the time constant for discharging so that the brightness of the lamp and the brightness of the LED change similarly when the switch is operated.

8. A load control circuit connected to a plurality of first capacitors, a second capacitor, a first load, and a second load, the load control circuit comprising:
    a potential converter for generating a reference potential;
    a plurality of first triangular wave generation circuits, each connected to an associated one of the first capacitors, for generating a first triangular wave signal by charging and discharging the associated first capacitor;
    a second triangular wave generation circuit, connected to the second capacitor, for generating a second triangular wave signal by charging and discharging a second capacitor;
    a switching circuit, connected to the first triangular wave generation circuits, for selecting one of the first triangular wave generation circuits in accordance with a switch signal to generate a selected one of the first triangular wave signals;
    a first waveform shaping circuit, connected to the potential converter and the switching circuit, for converting the selected one of the first triangular wave signals based on the reference potential to a first duty signal to control the first load; and
    a second waveform shaping circuit, connected to the potential converter, for converting the second triangular wave signal based on the reference potential to a second duty signal to control the second load, the first triangular wave generation circuits each generating the first triangular wave signal with an amplitude differing from that of the second triangular wave signal, and the switching circuit switching the selected one of the first triangular wave generation circuits so that the first duty signal changes differently from the second duty signal when the switch signal reaches a predetermined threshold value.

9. The load control circuit according to claim 8, wherein the plurality of first triangular wave generation circuits include:
a first triangular wave generation circuit for generating a first triangular wave signal having a bottom value that is the same as that of the second triangular wave generation circuit; and
a further first triangular wave generation circuit for generating a first triangular wave signal having a peak value that is the same as that of the second triangular wave signal.

10. The load control circuit according to claim 1, wherein the predetermined threshold value is set so that when the selected one of the first triangular wave generation circuits is switched, a duty ratio of the first duty signal immediately after the switching is substantially the same as the duty ratio of the first duty signal immediately before the switching.

11. The load control circuit according to claim 1, wherein the switching signal is the reference potential generated by the reference converter.

12. The load control circuit according to claim 1, wherein the plurality of first triangular wave generation circuits include:
a first triangular wave generation circuit for generating a first triangular wave signal having a cycle that is the same as that of the second triangular wave signal and an amplitude that is greater than that of the second triangular wave generation circuit; and
a further first triangular wave generation circuit for generating a first triangular wave signal having a cycle that is the same as that of the second triangular wave signal and an amplitude that is less than that of the second triangular wave signal.

13. A load control circuit connected to a capacitor, a first load, and a second load, the load control circuit comprising:
a potential converter for generating a first reference potential and a second reference potential;
a triangular wave generation circuit, connected to the capacitor, for generating a triangular wave signal by charging and discharging the capacitor;
a first waveform shaping circuit, connected to the triangular wave generation circuit, for converting the triangular wave signal based on the first reference potential to a first duty signal to control the first load; and
a second waveform shaping circuit, connected to the triangular wave generation circuit, for converting the triangular wave signal based on the second reference potential to a second duty signal to control the second load, wherein the potential converter generates the first and second reference potentials differently so that the first duty signal changes differently from the second duty signal.

14. The load control circuit according to claim 13, wherein the potential converter converts the first reference potential to generate the second reference potential.

15. The load control circuit according to claim 14, wherein the potential converter increases a changing rate of the second reference potential as the first reference potential increases.

16. A system for controlling a first load and a second load, the system comprising:
a first capacitor;
a second capacitor;
a first triangular wave generation circuit, connected to the first capacitor, for generating a first triangular wave signal by charging and discharging the first capacitor;
a second triangular wave generation circuit, connected to the second capacitor, for generating a second triangular wave signal by charging and discharging the second capacitor, the second triangular wave signal having an amplitude that is the same as that of the first triangular wave signal;
a potential converter for generating a reference potential;
a switch, connected to a voltage converter, for determining a reference potential;
a first waveform shaping circuit, connected to the potential converter and the first triangular wave generation circuit, for converting the first triangular wave signal based on the reference potential to a first duty signal to control the first load; and
a second waveform shaping circuit, connected to the potential converter and the second triangular wave generation circuit, for converting the second triangular wave signal based on the reference potential to a second duty signal to control the second load, the first triangular wave generation circuit changing at least one of a time constant for charging the first capacitor and a time constant for discharging the first capacitor so that the first duty signal changes differently from the second duty signal.

17. A system for controlling a first load and a second load, the system comprising:
a plurality of first capacitors;
a second capacitor;
a potential converter for generating a reference potential;
a plurality of first triangular wave generation circuits, each connected to an associated one of the first capacitors, for generating a first triangular wave signal by charging and discharging the associated first capacitor;
a second triangular wave generation circuit, connected to the second capacitor, for generating a second triangular wave signal by charging and discharging the second capacitor;
a switching circuit, connected to the first triangular wave generation circuits, for selecting one of the first triangular wave generation circuits in accordance with a switch signal to generate a selected one of the first triangular wave signals;
a first waveform shaping circuit, connected to the potential converter and the switching circuit, for converting the selected one of the first triangular wave signals based on the reference potential to a first duty signal to control the first load; and
a second waveform shaping circuit, connected to the potential converter, for converting the second triangular wave signal based on the reference potential to a second duty signal to control the second load, the first triangular wave generation circuits each generating the first triangular wave signal with an amplitude differing from that of the second triangular wave signal, and the switching circuit switching the selected one of the first triangular wave generation circuits so that the first duty signal changes differently from the second duty signal when the switch signal reaches a predetermined threshold value.

18. A system for controlling a first load and a second load, the system comprising:
   a capacitor;
   a potential converter for generating a first reference potential and a second reference potential;
   a switch, connected to a voltage converter, for determining the first and second reference potentials;
   a triangular wave generation circuit, connected to the capacitor, for generating a triangular wave signal by charging and discharging the capacitor;
   a first waveform shaping circuit, connected to the triangular wave generation circuit, for converting the triangular wave signal based on the first reference potential to a first duty signal to control the first load; and
   a second waveform shaping circuit, connected to the triangular wave generation circuit, for converting the triangular wave signal based on the second reference potential to a second duty signal to control the second load, wherein the potential converter-generates the first and second reference potentials differently so that the first duty signal changes differently from the second duty signal.

19. A method for controlling a first load and a second load, the method comprising:
   generating a first triangular wave signal by charging and discharging a first capacitor;
   generating a second triangular wave signal by charging and discharging a second capacitor;
   generating a reference potential;
   converting the first triangular wave signal based on the reference potential to a first duty signal to control the first load;
   converting the second triangular wave signal based on the reference potential to a second duty signal to control the second load; and
   changing at least one of a time constant for charging the first capacitor and a time constant for discharging the first capacitor so that the first duty signal changes differently from the second duty signal.

20. A method for controlling a first load and a second load, the method comprising:
   generating a reference potential;
   generating a plurality of first triangular wave signals by charging and discharging a plurality of first capacitors;
   generating a second triangular wave signal by charging and discharging a second capacitor;
   selecting one of the first triangular wave signals in accordance with a switch signal;
   converting the selected one of the first triangular wave signals based on the reference potential to a first duty signal to control the first load; and
   converting the second triangular wave signal based on the reference potential to a second duty signal to control the second load, wherein said generating a plurality of first triangular wave signals includes generating the first triangular wave signals with an amplitude differing from that of the second triangular wave signal, and said selecting one of the first triangular wave signals includes switching the selected one of the first triangular wave signals so that the first duty signal changes differently from the second duty signal when the switch signal reaches a predetermined threshold value.

21. A method for controlling a first load and a second load, the method comprising:
   generating a first reference potential and a second reference potential;
   generating a triangular wave signal by charging and discharging a capacitor;
   converting the triangular wave signal based on the first reference potential to a first duty signal to control the first load; and
   converting the triangular wave signal based on the second reference potential to a second duty signal to control the second load, wherein said generating a first reference potential and a second reference potential includes generating the first and second reference potentials differently so that the first duty signal changes differently from the second duty signal.

* * * * *

UNITED STATES PATENT AND TRADEMARK OFFICE
CERTIFICATE OF CORRECTION

PATENT NO. : 7,180,247 B2 Page 1 of 1
APPLICATION NO. : 11/006190
DATED : February 20, 2007
INVENTOR(S) : Kawarazaki It is certified that error appears in the above-identified patent and that said Letters Patent is hereby corrected as shown below:

Claim 10, column 19, line 22, should read as follows: --The load control circuit according to claim 8,--.

Claim 11, column 19, line 28, should read as follows: --The load control circuit according to claim 8,--.

Claim 12, column 19, line 31, should read as follows: --The load control circuit according to claim 8,--.

Signed and Sealed this

First Day of May, 2007

JON W. DUDAS
*Director of the United States Patent and Trademark Office*